United States Patent
Brucher et al.

(10) Patent No.: US 10,289,643 B2
(45) Date of Patent: *May 14, 2019

(54) AUTOMATIC DISCOVERY OF POPULAR LANDMARKS

(71) Applicant: Google Inc., Mountian View, CA (US)

(72) Inventors: Fernando A. Brucher, Irvine, CA (US); Ulrich Buddemeier, Sebastopol, CA (US); Hartwig Adam, Los Angeles, CA (US); Hartmut Neven, Malibu, CA (US)

(73) Assignee: Google LLC, Mountain View, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/284,075

(22) Filed: Oct. 3, 2016

(65) Prior Publication Data

US 2017/0024415 A1 Jan. 26, 2017

Related U.S. Application Data

(60) Continuation of application No. 14/680,000, filed on Apr. 6, 2015, now Pat. No. 9,483,500, which is a
(Continued)

(51) Int. Cl.
*G06F 17/30* (2006.01)
*G06F 16/583* (2019.01)
(Continued)

(52) U.S. Cl.
CPC ...... *G06F 16/5838* (2019.01); *G06F 3/04842* (2013.01); *G06F 7/08* (2013.01);
(Continued)

(58) Field of Classification Search
CPC ........... G06F 17/30817; G06F 17/3069; G06F 17/30864; G06F 17/30823;
(Continued)

(56) References Cited

U.S. PATENT DOCUMENTS

| 6,580,811 B2 | 6/2003 | Maurer et al. |
| 6,711,293 B1 | 3/2004 | Lowe |

(Continued)

FOREIGN PATENT DOCUMENTS

| CN | 101228785 | 7/2008 |
| EP | 1921853 | 5/2008 |

(Continued)

OTHER PUBLICATIONS

SIPO, "First Office Action in Chinese Application No. 201410455635.0", dated Mar. 1, 2017.
(Continued)

*Primary Examiner* — Jingge Wu
(74) *Attorney, Agent, or Firm* — IP Spring

(57) ABSTRACT

In one embodiment the present invention is a method for populating and updating a database of images of landmarks including geo-clustering geo-tagged images according to geographic proximity to generate one or more geo-clusters, and visual-clustering the one or more geo-clusters according to image similarity to generate one or more visual clusters. In another embodiment, the present invention is a system for identifying landmarks from digital images, including the following components: a database of geo-tagged images; a landmark database; a geo-clustering module; and a visual clustering module. In other embodiments the present invention may be a method of enhancing user queries to retrieve images of landmarks, or a method of automatically tagging a new digital image with text labels.

21 Claims, 13 Drawing Sheets

Related U.S. Application Data continuation of application No. 13/619,652, filed on Sep. 14, 2012, now Pat. No. 9,014,511, which is a division of application No. 12/119,359, filed on May 12, 2008, now Pat. No. 8,676,001.

(51) Int. Cl.

| | | |
|---|---|---|
| G06F 16/29 | (2019.01) | |
| G06F 16/51 | (2019.01) | |
| G06F 16/58 | (2019.01) | |
| G06F 3/0484 | (2013.01) | |
| G06K 9/00 | (2006.01) | |
| G06T 7/00 | (2017.01) | |
| G06F 7/08 | (2006.01) | |

(52) U.S. Cl.
CPC .............. *G06F 16/29* (2019.01); *G06F 16/51* (2019.01); *G06F 16/58* (2019.01); *G06F 16/5846* (2019.01); *G06F 16/5866* (2019.01); *G06K 9/0063* (2013.01); *G06T 7/97* (2017.01)

(58) Field of Classification Search
CPC ......... G06F 17/30017; G06F 17/30253; G06F 17/30646; G06F 17/30675; G06F 17/30719; G06F 17/30256; G06F 3/04842; G06F 7/08; G06F 17/30241; G06F 17/30265; G06F 17/30268; G06F 17/3028; G06T 7/97; G06K 9/0063
See application file for complete search history.

(56) References Cited

U.S. PATENT DOCUMENTS

| | | | |
|---|---|---|---|
| 7,340,458 | B2 | 3/2008 | Vaithilingam et al. |
| 7,353,114 | B1 | 4/2008 | Rohlf et al. |
| 7,702,185 | B2 | 4/2010 | Keating et al. |
| 7,840,558 | B2 | 11/2010 | Wiseman et al. |
| 7,870,227 | B2 | 1/2011 | Patel et al. |
| 8,027,832 | B2 | 9/2011 | Ramsey et al. |
| 8,037,011 | B2 | 10/2011 | Gadanho et al. |
| 8,396,287 | B2 | 3/2013 | Adam |
| 9,014,511 | B2 | 4/2015 | Brucher et al. |
| 9,020,247 | B2 | 4/2015 | Adam |
| 2004/0064334 | A1 | 4/2004 | Nye |
| 2005/0021202 | A1 | 1/2005 | Russell et al. |
| 2005/0027492 | A1 | 2/2005 | Taylor et al. |
| 2005/0036712 | A1 | 2/2005 | Wada |
| 2006/0015496 | A1 | 1/2006 | Keating et al. |
| 2006/0015497 | A1 | 1/2006 | Keating et al. |
| 2006/0020597 | A1 | 1/2006 | Keating et al. |
| 2006/0095521 | A1 | 5/2006 | Patinkin |
| 2006/0095540 | A1 | 5/2006 | Anderson et al. |
| 2006/0242139 | A1 | 10/2006 | Butterfield et al. |
| 2007/0110316 | A1 | 5/2007 | Ohashi |
| 2007/0115373 | A1 | 5/2007 | Gallagher et al. |
| 2007/0154115 | A1 | 7/2007 | Yoo |
| 2007/0174269 | A1 | 7/2007 | Jing et al. |
| 2007/0208776 | A1 | 9/2007 | Perry et al. |
| 2008/0005091 | A1 | 1/2008 | Lawler et al. |
| 2008/0010262 | A1* | 1/2008 | Frank ................ G06F 17/30241 |
| 2008/0080745 | A1 | 4/2008 | Vanhoucke et al. |
| 2008/0086686 | A1 | 4/2008 | Jing et al. |
| 2008/0104040 | A1 | 5/2008 | Ramakrishna |
| 2008/0118160 | A1 | 5/2008 | Fan et al. |
| 2008/0140644 | A1 | 6/2008 | Franks et al. |
| 2008/0162469 | A1 | 7/2008 | Terayoko |
| 2008/0268876 | A1 | 10/2008 | Gelfand et al. |
| 2008/0292186 | A1 | 11/2008 | Hamamura |
| 2008/0310759 | A1 | 12/2008 | Liu et al. |
| 2008/0320036 | A1 | 12/2008 | Winter |
| 2009/0049408 | A1 | 2/2009 | Naaman et al. |
| 2009/0143977 | A1 | 6/2009 | Beletski et al. |
| 2009/0161962 | A1* | 6/2009 | Gallagher ......... G06F 17/30247 382/203 |
| 2009/0171568 | A1 | 7/2009 | McQuaide, Jr. |
| 2009/0216794 | A1 | 8/2009 | Saptharishi |
| 2009/0279794 | A1 | 11/2009 | Brucher et al. |
| 2009/0290812 | A1 | 11/2009 | Naaman et al. |
| 2009/0292685 | A1 | 11/2009 | Liu et al. |
| 2009/0297012 | A1 | 12/2009 | Brett et al. |
| 2010/0076976 | A1 | 3/2010 | Sotirov et al. |
| 2010/0205176 | A1 | 8/2010 | Ji et al. |
| 2010/0250136 | A1 | 9/2010 | Chen |

FOREIGN PATENT DOCUMENTS

| | | |
|---|---|---|
| JP | 1995168855 | 7/1995 |
| JP | 10134042 | 5/1998 |
| JP | 2011328194 | 11/1999 |
| JP | 2000-259669 | 9/2000 |
| JP | 2002259976 | 9/2002 |
| JP | 2002010178 | 11/2002 |
| JP | 2004021717 | 1/2004 |
| JP | 2007507775 | 3/2007 |
| JP | 2007142672 | 6/2007 |
| JP | 2007197368 | 8/2007 |
| JP | 2007316876 | 12/2007 |
| JP | 2007334505 | 12/2007 |
| JP | 200833399 | 2/2008 |
| JP | 2008129942 | 6/2008 |
| JP | 2008165303 | 7/2008 |
| JP | 2009526302 | 7/2009 |
| KR | 10-2006-0026924 | 3/2006 |
| KR | 101579634 | 2/2011 |
| WO | 2006/055514 | 5/2006 |
| WO | 2007/013432 | 2/2007 |
| WO | 2007/094537 | 8/2007 |
| WO | WO 2008/045704 | 4/2008 |
| WO | 2008/055120 | 5/2008 |
| WO | 2008/152805 | 12/2008 |

OTHER PUBLICATIONS

CNOA, "Second Office Action in Chinese Application No. 201410455635.0", dated Sep. 18, 2017, 6 pages.

"Examination Report for CA Application No. 2,762,090", dated Apr. 10, 2017, 4 Pages.

Batur et al., "Adaptive Active Appearance Models", IEEE Transactions on Image Processing vol. 14, No. 11, Nov. 2005, pp. 1707-1721.

SIPO, Notification for Patent Registration Formalities and Notification on the Grant of Patent Right for Invention (with English translations) for Chinese Patent Application No. 201410455635.0, Jan. 17, 2018, 4 pages.

Toyama, et al., "Geographic location tags on digital images", Nov. 2003, pp. 156-166.

USPTO, "Preinterview First OA in U.S. Appl. No. 15/663,796", dated Jan. 26, 2018.

EPO, "Office Action in European Application No. 10724937.7", dated Nov. 9, 2017, 5 Pages.

USPTO, Final Office Action for U.S. Appl. No. 15/663,796, dated Oct. 5, 2018, 16 pages.

Notice of Allowance mailed in U.S. Appl. No. 14/683,643, dated Mar. 7, 2017, 8 pages.

JPO Office Action mailed in Japanese Application No. 2012-511045, dated Apr. 9, 2014.

SIPO Office Action mailed in Chinese Patent Application No. 200980127106.5, dated Aug. 24, 2012.

JPO Notice of Allowance mailed in Japanese Application No. 2012-511045, dated Dec. 12, 2014.

JPO Office Action mailed in Japanese Application No. 2012-511045, dated Dec. 3, 2013.

KIPO Office Action mailed in KR Patent Application No. 10-2010-7027837, dated Feb. 27, 2015.

USPTO Non-Final Rejection mailed in U.S. Appl. No. 13/759,916, dated Jan. 15, 2014.

SIPO Office Action mailed in Chinese Application No. 201080030849.3, dated Jan. 17, 2014.

(56) References Cited

OTHER PUBLICATIONS

SIPO Office Action mailed in Chinese Patent Application No. 201080030849.3, dated Jan. 19, 2015.
SIPO Office Action mailed in Chinese Patent Application No. 200980127106.5, dated Jan. 30, 2014.
SIPO Office Action mailed in Chinese Patent Application No. 201080030849.3, dated Jul. 10, 2014.
USPTO Non-Final Rejection mailed in U.S. Appl. No. 12/119,359, dated Jun. 17, 2011.
USPTO Final Rejection mailed in U.S. Appl. No. 13/759,916, dated Jun. 24, 2014.
USPTO Non-Final Rejection mailed in U.S. Appl. No. 12/119,359, dated Jun. 4, 2013.
PCT International Search Report and Written Opinion mailed in PCT Application No. PCT/US2009/002916, dated Mar. 2, 2010.
USPTO Final Rejection mailed in U.S. Appl. No. 13/619,652, dated Mar. 25, 2014.
USPTO Non-Final Rejection mailed in U.S. Appl. No. 12/119,359, dated May 21, 2012.
SIPO Office Action mailed in Chinese Patent Application No. 200980127106.5, dated May 24, 2013.
USPTO Final Rejection mailed in U.S. Appl. No. 12/119,359, dated Nov. 10, 2011.
USPTO Non-Final Rejection mailed in U.S. Appl. No. 13/619,652, dated Nov. 6, 2013.
USPTO Final Rejection mailed in U.S. Appl. No. 12/119,359, dated Nov. 8, 2012.
EPO Office Action mailed in EP Patent Application No. 10 724 937.7, dated Oct. 2, 2014.
JPO Office Action mailed in Japanese Patent Application No. 2014-021923, dated Oct. 30, 2014.
USPTO Non-Final Rejection mailed in U.S. Appl. No. 13/619,652, dated Sep. 2, 2014.
PCT International Search Report and Written Opinion mailed in PCT Application No. PCT/US2010/034930, dated Sep. 7, 2010, 12 pages.
"Canadian Office Action", CA Application No. 2,762,090, dated May 2, 2016.
"KIPO Notice of Preliminary Rejection", Korean Application No. 10-2011-7029949, dated Dec. 18, 2015.
"Non-Final Office Action", U.S. Appl. No. 14/680,000, dated Mar. 31, 2016.
"Non-Final Office Action in U.S. Appl. No. 14/683,643", dated Oct. 6, 2016, 11 pp.
"Notice of Acceptance", in Australian Office Action No. 2010248862, dated May 30, 2016, 2 pages.
Ahern, et al., "World Explorer: visualizing aggregate data from unstructured text in gee-referenced collections", JCDL '07, Canada, Jun. 17-22, 2007.
Batur, , "Adaptive active appearance models", IEEE transactions on image processing, vol. 14, No. 11, Nov. 2005, pp. 1707-1721.
Buddemeier, et al., "Clustering Images Using an Image Region Graph", U.S. Appl. No. 12/183,613, Jul. 31, 2008.
Buddemeier, et al., "Systems and Methods for Descrptor Vector Computation", U.S. Appl. No. 12/049,841, Mar. 17, 2008.
Gronau, et al., "Optimal Implementations of UPGMA and Other Common Clustering Algorithms", Information Processing Letters, 2007.
Kandel, et al., "Photospread: A Spreadsheet for Managing Photos", ACM Proc. Chi., Apr. 5, 2008.
Kennedy, et al., "Generating diverse and representative image search results for landmarks", Proceeding of the 17th international conference on World Wide Web, Apr. 21-25, 2008, pp. 297-306.
Kennedy, et al., "How Flickr Helps us Make Sense of the World: Context and Content in Community-Contributed Media Collections", MM' 07, Augsburg, Bavaria, Germany, Sep. 23-28, 2007.
Li, et al., "Modeling and Recognition of Landmark hnage Collections Using Iconic Scene Graphs", Proceedings of ECCV 2008, Lecture Notes in Computer Science, Springer, Oct. 12, 2008, pp. 427-440.
Lindeberg, et al., "On Scale Selection for Differential Operators", Proc. 8th Scandinavian Conference on Image Analysis, 1993.
Lowe, et al., "Distinctive Image Features from Scale-Invariant Keypoints", International Journal of Computer Vision, Jan. 5, 2004, 28 pages.
"Object Recognition from Local Scale-Invariant Features", Proc. of the International Conference on Computer Vision, 1999, pp. 1150-1157.
Maurer, et al., "Tracking and Learning Graphs of Image Sequences of Faces", Proceedings of International Conference on Artificial Neural Networks at Bochum, 2006.
Takeuchi, "Evaluation of Image-Based Landmark Recognition Techniques", Technical Report CMU-RI-TR-98-20, Carnegie Mellon University, Jul. 1, 1998, 16 pages.
Toyama, et al., "Geographic Location Tags on Digital Images", ACM, Nov. 2003, pp. 156-166.
Tsai, et al., "Extent: Inferring image metadata from context and content", Proc. IEEE International Conference on Multimedia and Expo, 2005, pp. 1154-1157.
Vu, et al., "Image Retrieval Based on Regions of Interest", IEEE Transactions on Knowledge and Data Engineering, Jul. 2003.
Yamada, et al., "A sightseeing contents delivery system", Report of Technical Study by the Institute of Electronics, Information and Communication Engineers, Japan, 2005.
USPTO, Notice of Allowance for U.S. Appl. No. 15/663,796 dated Jan. 23, 2019, 6 pages.

\* cited by examiner

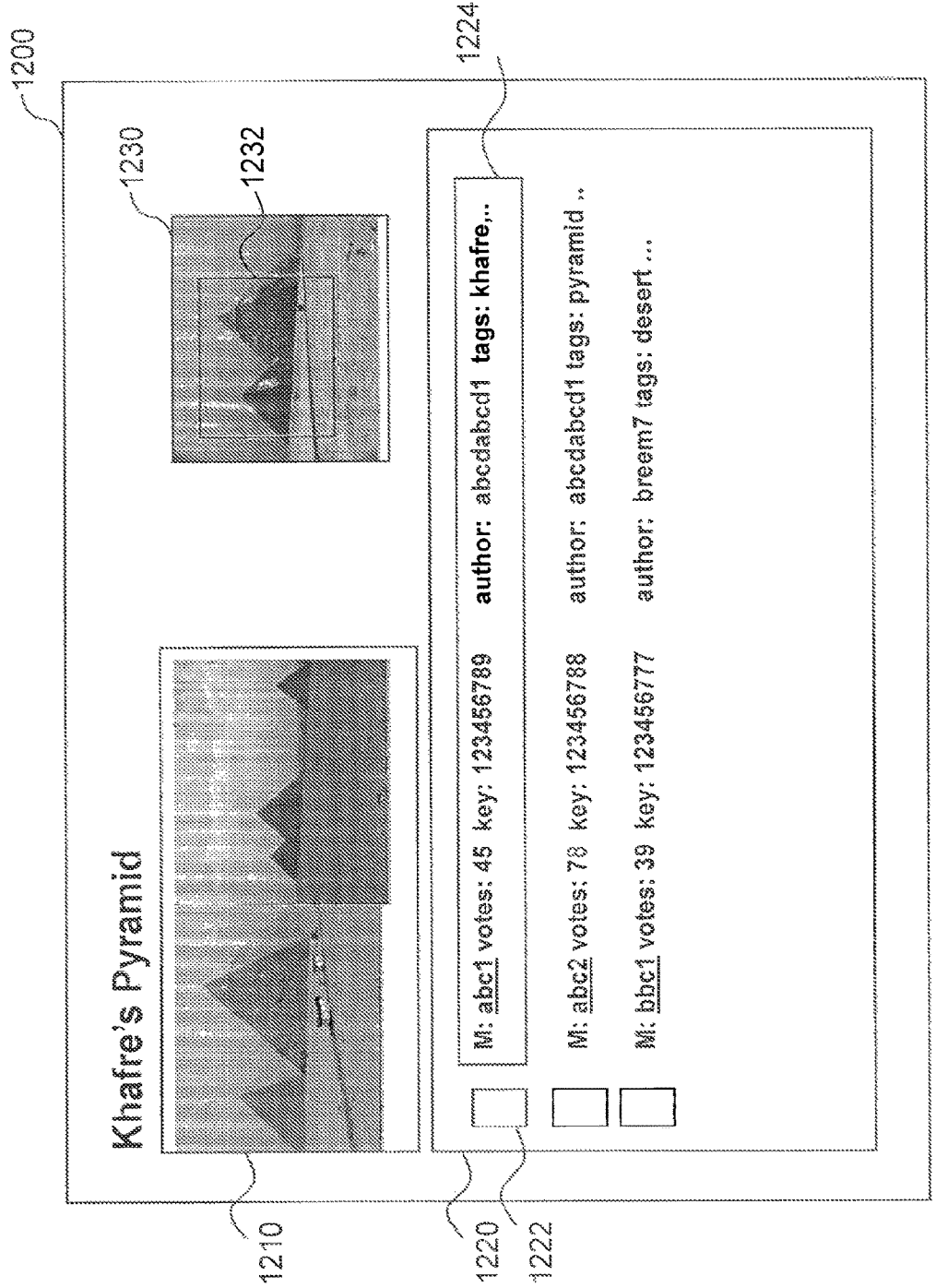

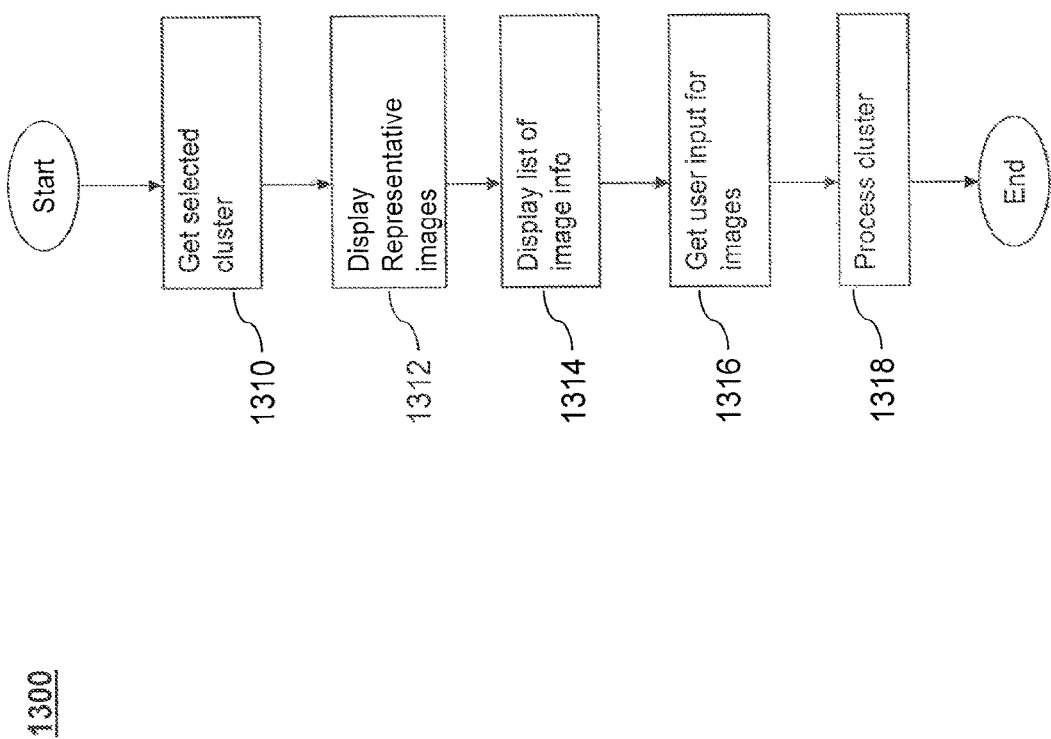

AUTOMATIC DISCOVERY OF POPULAR LANDMARKS

RELATED APPLICATIONS

This application is a continuation of, and claims priority to, U.S. Pat. No. 9,483,500 filed Apr. 6, 2015, which is a continuation of, and claims priority to, U.S. Pat. No. 9,014,511 filed Sep. 14, 2012, which is a divisional of, and claims priority to, U.S. Pat. No. 8,676,001 filed May 12, 2008, the entire contents of which are incorporated herein by reference in their entirety.

BACKGROUND

This invention relates in general to digital image collections, and more particularly, to identifying popular landmarks in large digital image collections.

With the increased use of digital images, increased capacity and availability of digital storage media, and the interconnectivity offered by digital transmission media such as the Internet, ever larger corpora of digital images are accessible to an increasing number of people. Persons having a range of interests from various locations spread throughout the world take photographs of various subjects and can make those photographs available, for instance, on the Internet. For example, digital photographs of various landmarks and tourist sites from across the world may be taken by persons with different levels of skill in taking photographs and posted on the web. The photographs may show the same landmark from different perspectives, and taken from the same or different distances.

To leverage the information contained in these large corpora of digital images, it is necessary that the corpora be organized. For example, at digital image web sites such as Google Photos or Picasa, starting at a high level menu, one may drill down to a detailed listing of subjects for which photographs are available. Alternatively, one may be able to search one or more sites that have digital photographs. Some tourist information websites, for example, have downloaded images of landmarks associated with published lists of popular tourist sites.

However, there is no known system that can automatically extract information such as the most popular tourist destinations from these large collections. As numerous new photographs are added to these digital image collections, it may not be feasible for users to manually label the photographs in a complete and consistent manner that will increase the usefulness of those digital image collections. What is needed therefore, are systems and methods that can automatically identify and label popular landmarks in large digital image collections.

SUMMARY

In one embodiment the present invention is a method for populating and updating a database of images of landmarks including geo-clustering geo-tagged images according to geographic proximity to generate one or more geo-clusters, and visual-clustering the one or more geo-clusters according to image similarity to generate one or more visual clusters.

In another embodiment, the present invention is a system for identifying landmarks from digital images, including the following components: a database of geo-tagged images; a landmark database; a geo-clustering module in communication with said database of geo-tagged images, wherein the geo-tagged images are grouped into one or more geo-clusters; and a visual clustering module in communication with said geo-clustering module, wherein the one or more geo-clusters are grouped into one or more visual clusters, and wherein visual cluster data is stored in the landmark database.

In a further embodiment the present invention is a method of enhancing user queries to retrieve images of landmarks, including the stages of receiving a user query; identifying one or more trigger words in the user query; selecting one or more corresponding tags from a landmark database corresponding to the one or more trigger words; and supplementing the user query with the one or more corresponding tags, generating a supplemented user query.

In yet another embodiment the present invention is a method of automatically tagging a new digital image, including the stages of: comparing the new digital image to images in a landmark image database, wherein the landmark image database comprises visual clusters of images of one or more landmarks; and tagging the new digital image with at least one tag based on at least one of said visual clusters.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 12 is an example user interface screen showing details about one visual cluster, according to an embodiment of the present invention.

FIG. 13 is a flowchart illustrating the operation of a method to maintain visual clusters according to an embodiment of the present invention.

DETAILED DESCRIPTION OF EMBODIMENTS

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

The present invention includes methods and systems for automatically identifying and classifying objects in digital images. For example, embodiments of the present invention may identify, classify and prioritize most popular tourist landmarks based on digital image collections that are accessible on the Internet. The method and systems of the present invention can enable the efficient maintenance of an up-to-date list and collections of images for the most popular tourist locations, where the popularity of a tourist location can be approximated by the number of images of that location posted on the Internet by users.

Figure 1:
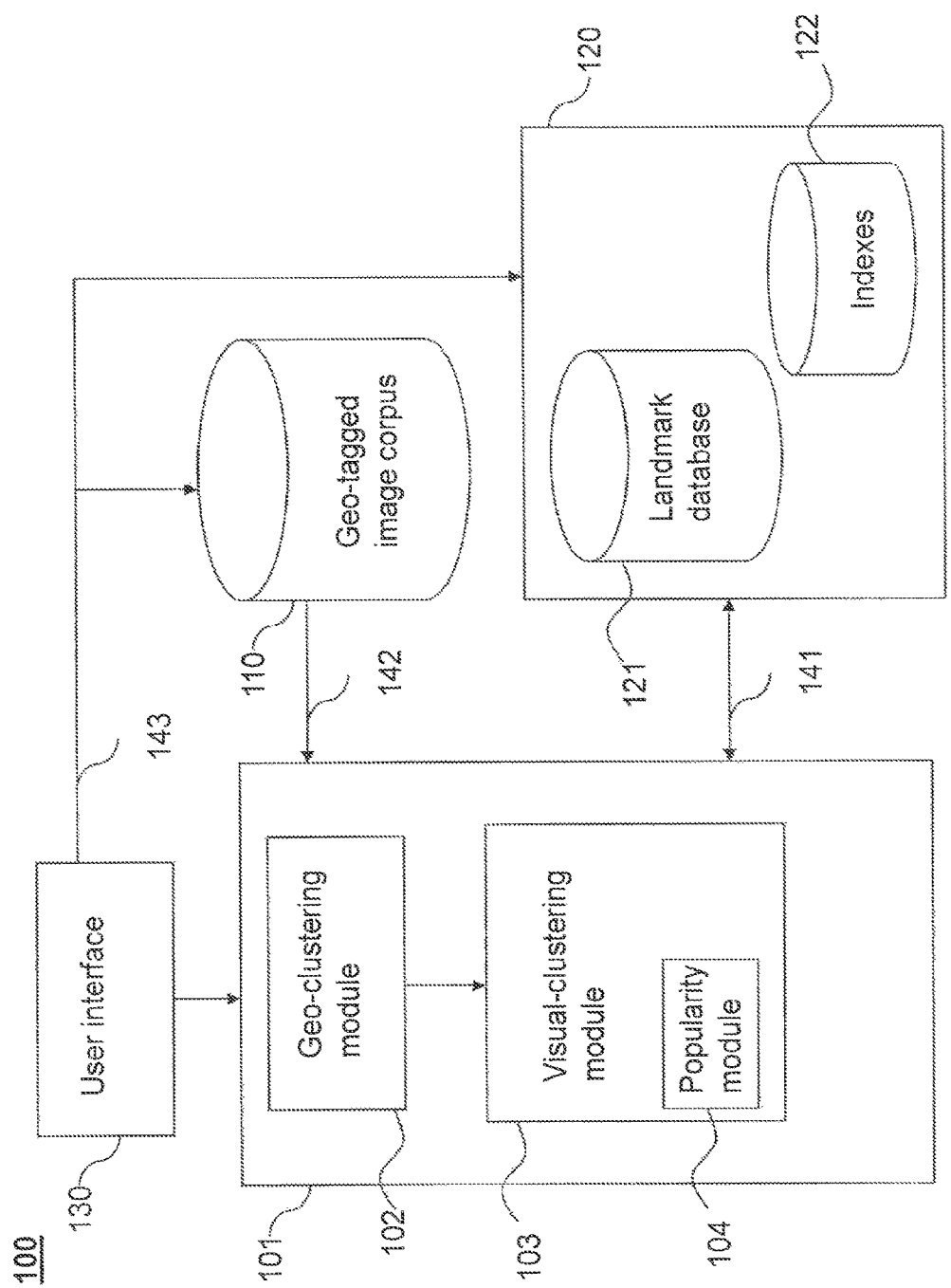
FIG. 1 is a system to populate and update a landmark image database according to an embodiment of the present invention.

A popular landmark recognition system 100 according to an embodiment of the present invention is shown in FIG. 1. Processing module 101 includes a geo-clustering module 102 and a visual clustering module 103. The visual clustering module 103 may also include a popularity module 104. The processing functionality of modules 102-104 is described below: the geo-clustering module 102 is described with respect to FIGS. 3-4; and the visual clustering module is described with respect to FIG. 5. The processing functionality of modules 102-104 may be achieved in software, hardware or a combination thereof. For example, modules 102-104 may be implemented entirely as software modules, or some of the functionality of the geo-clustering module 102 may be implemented using hardware such as a field programmable gate array (FPGA). It will be understood by a person of skill in the art that processing module 101 may include additional components and modules that facilitate the functions of the present invention. For example, processing module 101 may include one or more processors, a memory, a storage device, modules for interfacing to external devices including the graphical user interface 130, the geo-tagged image corpus 110, and the landmark database system 120.

The landmark database system 120 may include a landmark database 121 and associated indexes 122. The landmark database system 120 may be co-located on the same processing platform as module 101 or may be separately located. The landmark database 121 may include a collection of landmarks recognized by the system 100. The information stored for each landmark in landmark database 121 may include images or a list of images of the landmark, image and feature templates, and metadata from the images including geo-coordinates, time, and user information. The landmark database 121 may also contain the visual clustering and geo-clustering data required for the processing in processing module 101. The indexes 122 may include indexing that arranges the landmarks in landmark database 121 in order of one or more of, for example and without limitation, popularity, geographic region, time, or other user defined criteria as points of interest. The link 141 may be any one or a combination of interconnection mechanisms including, for example and without limitation, Peripheral Component Interconnect (PCI) bus, IEEE 1394 Firewire interface, Ethernet interface, or an IEEE 802.11 interface.

A user interface 130 allows a user or other external entity to interact with the processing system 101, the landmark database system 120, and the geo-tagged image corpus 110. The user interface 130 may be connected to other entities of the system 100 using any one or a combination of interconnection mechanisms including, for example and without limitation, PCI bus, IEEE 1394 Firewire interface, Ethernet interface, or an IEEE 802.11 interface. One or more of a graphical user interface, a web interface, and application programming interface may be included in user interface 130.

The geo-tagged image corpus 110 may include one or more digital geo-tagged image corpora distributed across one or more networks. A person skilled in the art will understand that the corpus 110 may also be implemented as a collection of links to accessible geo-tagged image collections that are distributed throughout a network. The corpus 110 may also be implemented by making copies (for example, downloading and storing in local storage) of all or some images available in distributed locations. In some embodiments, a part of the geo-tagged image corpus may exist on the same processing platform as the processing system 101 and/or landmark database system 120. The different collections of geo-tagged images that constitute the geo-tagged image corpus 110 may be interconnected through the Internet, an intra-network or other form of inter-network. The processing system 101 takes as input, images made available from the geo-tagged image corpus. In some embodiments, the images from the distributed image collections may be converted to a standard graphic format such as GIF, either upon being stored in corpus 110 or before being input to processing module 101. Embodiments may also require that other forms of standardization, such as reduction or enhancement of resolution, or processing is performed on images prior to either upon being stored in corpus 110 or before being input to processing module 101. The corpus 110 may be connected to other components of the system by links 142 and 143 using any one or a combination of interconnection mechanisms including, for example and without limitation, PCI bus, IEEE 1394 Firewire interface, Ethernet interface, or an IEEE 802.11 interface.

Figure 2:
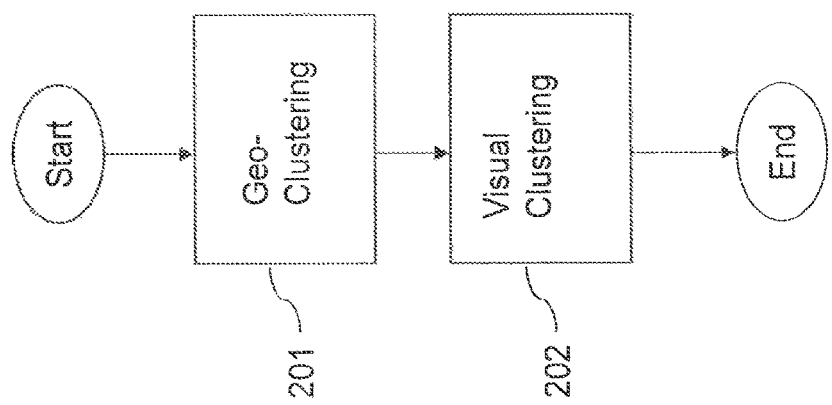
FIG. 2 shows a high level flowchart of a method implementing an embodiment of the present invention.

FIG. 2 is a flowchart of a process 200 of an embodiment of the present invention that creates or updates a database of landmarks 121 using geo-coded images from a image corpus 110. Process 200 includes two primary processing stages: a geo-clustering stage 201, and a visual clustering stage 202. Given a collection of geo-coded digital images, for example, a large collection of digital images of various tourist destinations, a geo-clustering stage 201 may divide the available images into separate groups based on the geo-location codes of each photograph. The geo-clustering stage makes use of the geo-coding available in each photograph to make a relatively quick separation of the images to different groups or geo-clusters. Pre-configured parameters, including a default radius within which images are considered to belong to the same geo-cluster may be utilized. The geo-clusters generated in the geo-clustering stage 201 are then input to the visual clustering stage 202. In the visual clustering stage 202, the system attempts to separate the images in each geo-cluster by subdividing into clusters of images of the same object or landmark (i.e., visual clusters) based on image similarity. Note that in general, geo-clustering of a collection of photographs is computationally less expensive than visual clustering of the same collection of images, due at least in part to the former being a comparison of geo-location information already included in each photograph. In contrast, for example, visual clustering 202 may include performing object recognition, feature vector generation and comparison for each identifiable object in each of the images, and then comparing the feature vectors of different images.

In some embodiments, visual cluster information including the associated images and/or references to associated images may be stored in a database such as landmark database 121. The images and/or the virtual images stored in landmark database 121 may be accessible using one or more indexes 122 that allow access to stored visual clusters based on configurable criteria including popularity. For example, the stored visual clusters may be processed by a popularity module 104 that updates an index 122 to allow access in order of the number of unique users that have submitted images to each cluster.

In some embodiments, selected visual clusters may be subjected to review by a user and/or may be further processed by a computer program. For example, optionally, visual clusters satisfying specified criteria, such as, having less than a predetermined number of images, may be subjected to review by a user. A user may modify one or more visual clusters by actions including, deleting an image, adding an image, or re-assigning an image to another cluster. A user may also specify new tag information or modify existing tag information. A person skilled in the art will understand that processing the visual clusters according to external data received from a user or a computer program may require the system to perform additional functions to maintain the consistency of the geo-cluster and visual cluster information stored in the database system 120.

Figure 3:
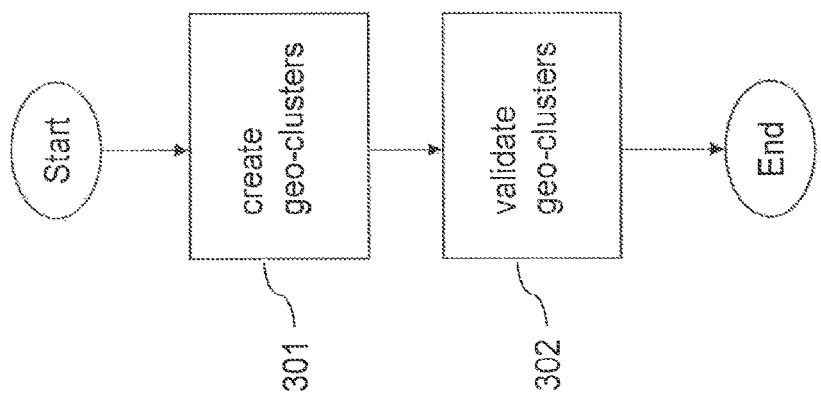
FIG. 3 is a flowchart showing more detailed operation of a geo-clustering stage shown in FIG. 2, in one embodiment.

FIG. 3 shows two processing stages, create geo-clusters 301 and validate geo-clusters 302, that are included in the geo-clustering stage 201 in some embodiments of the present invention. Creating geo-clusters 301 may include using one or more predefined radius parameters to determine if an image is within the geographic radius of another image based on the geo-location codes on both images. Note that the geo-clustering algorithm may be required to account for the geo-location coding that actually indicates the location of the camera instead of the location of the object or landmark. The geo-tagging of photographs may be achieved through several means including GPS-enabled digital cameras, GPS devices separate from the camera together with matching software, using a tool such as Google Earth, or manual editing of the photograph's Exchangeable Image Format (EXIF) tag. The methods of geo-tagging are generally known in the art and are not described in this disclosure. Also, although a default geographic cluster radius may be appropriate for most landmarks or objects of interest, some landmarks may require different cluster radius parameters in order to yield the most effective grouping of images. In stage 301, clusters of one or more images are generated based on geographic proximity.

In the geo-cluster validation stage 302, each one of the geo-clusters generated in the create geo clustering stage 301 may be validated based on selected criteria. For example, in one embodiment of the present invention, the goal may be to ensure that each geo-cluster selected for further processing reasonably includes a tourist landmark, i.e., a popular landmark. Accordingly, a validation criteria may be to further process only geo-clusters having images from more unique users than a predetermined threshold. A validation criteria such as having at least a predetermined number of unique users having submitted images of the same landmark, is likely to filter out images of other buildings, structures and monuments, parks, mountains, landscapes etc., that have little popular appeal. For example, an enthusiastic homeowner posting pictures of his newly built house of no popular appeal, is unlikely to post a number of images of his house that is substantial when compared to the number of images of any popular landmark posted by all users of Internet digital image collection sites. In one embodiment, the threshold may be set per season and/or per geographic area. In other embodiments, the threshold may be derived by first analyzing the geo-clusters for the distribution of unique users. In yet other embodiments, the threshold may be set for each type of landmark. The foregoing descriptions of means for setting the threshold is only for illustration. A person skilled in the art will understand that there are many other means through which the geo-clusters can be validated according to the focus of each use.

Figure 4:
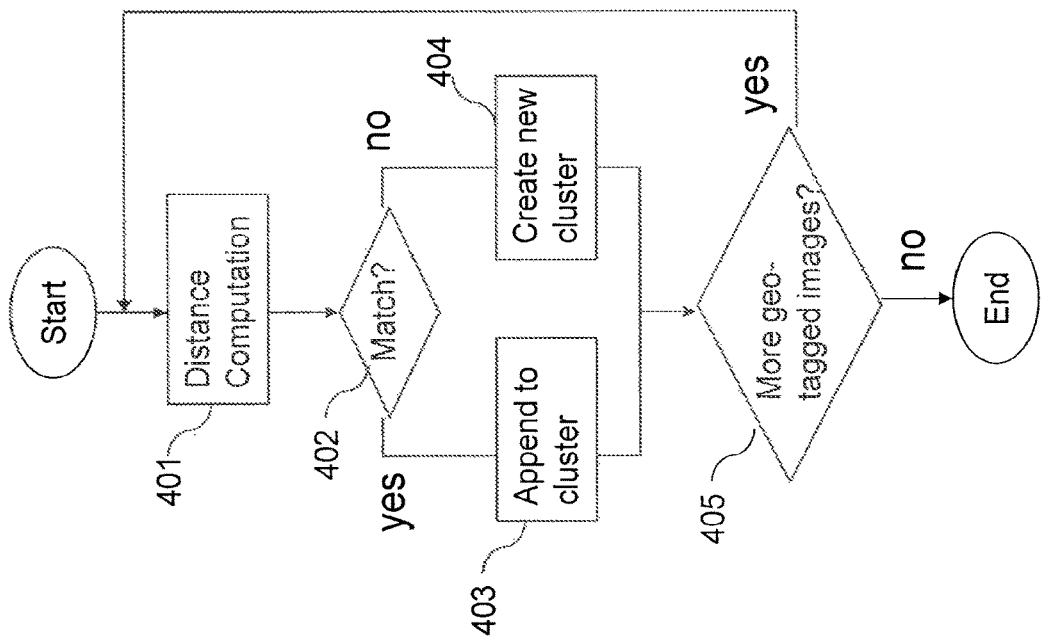
FIG. 4 is a flowchart showing more detailed operation of a geo-cluster creation stage shown in FIG. 3, in one embodiment.

FIG. 4 illustrates further details 301 of processing in the geo-clustering stage in an embodiment of the present invention. For each geo-tagged image, stages 401-405 may be repeated. For each geo-tagged image that does not already belong to a cluster, the distance from the image to each cluster is determined in stage 401. The distance determination may be based on the geo-coordinates of the center of the image. For example, in one embodiment the distance may be from the center of the image to the moving average image center of a cluster, where the moving average is updated each time a new image is added to the cluster and may be computed as the average of the centers of each of the images in the cluster. In stage 402, a decision is made as to whether the image matches an existing cluster. The decision may be based on the geographic coordinates of the image falling within an area defined by a predetermined radius from the center geographic coordinates of the cluster. The predetermined radius may, for example, be based on a per geographic area basis, based on analysis of the center coordinates of the images in each cluster, or be based on the type of landmark. If the image is considered a match for a existing cluster, then it is added to that cluster in stage 403. Otherwise, a new cluster is created in stage 404. Adding an image to an existing cluster, or creating a new cluster, some cluster parameters may need to be calculated such as the geo-graphic center coordinates for the cluster. When process 301 completes for the input set of geo-tagged images, a set of geo-clusters should be available. The geo-clusters, together with the associated information, may be stored as part of the geo-tagged image corpus 110 or another storage device accessible to the processing module 101. The information associated with each image or geo-cluster may include geo-location and other metadata describing images, text tags assigned to images where available, and additional location information (i.e., text labels specifying country and city) based on geo-location information for images.

Figure 5:
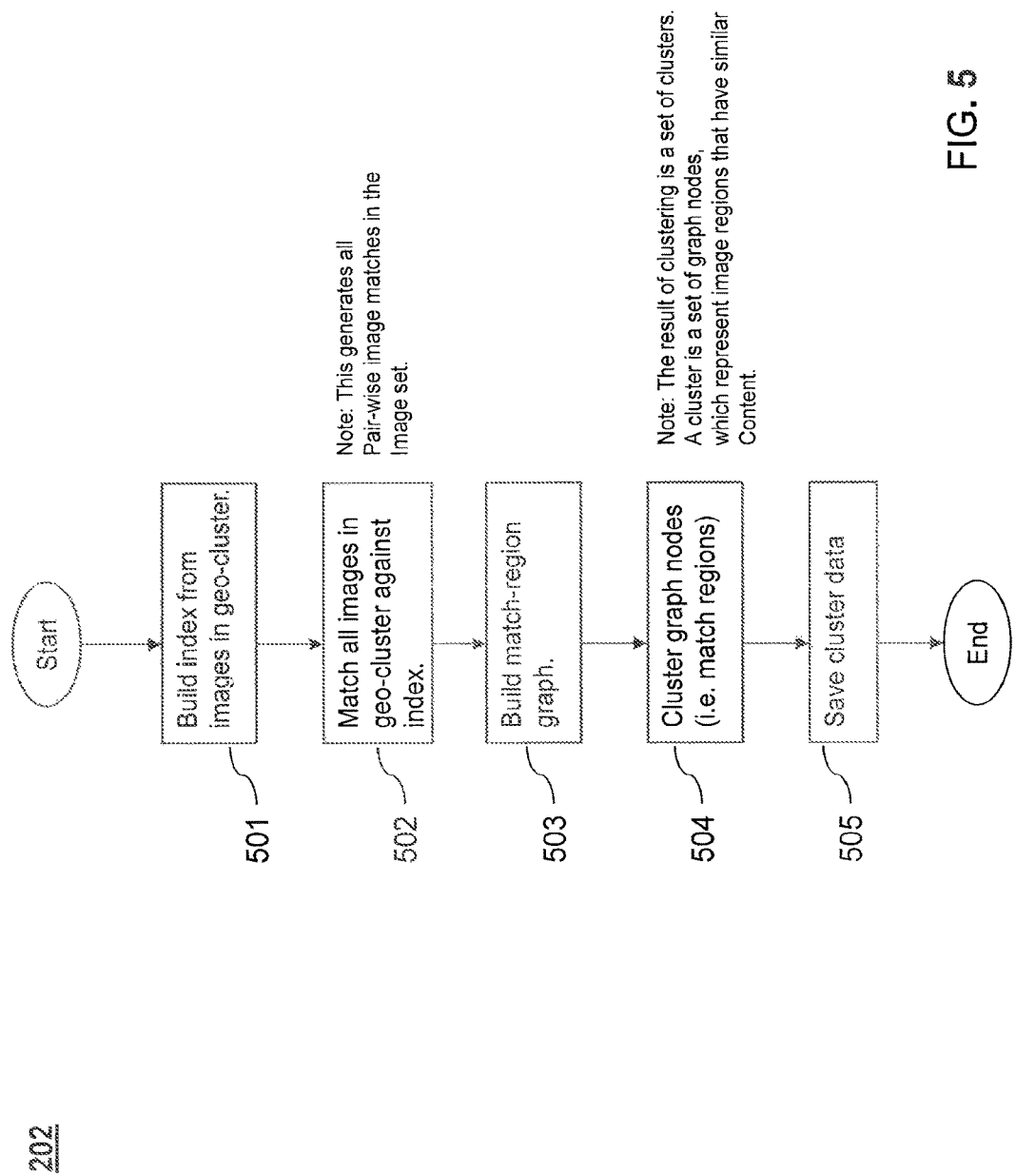
FIG. 5 is a flowchart showing more detailed operation of a visual-clustering stage shown in FIG. 2, in one embodiment.

FIG. 5 is a detailed view of the visual clustering stage 202 in an embodiment of the present invention. For each geo-cluster generated in stage 201, stages 501-505 are repeated. The input to the visual clustering stage 202 is a set of geo-clusters produced in stage 201. The output from the visual clustering stage 202, is one or more visual clusters for each of the input geo-clusters. Each visual cluster should include images having the same, for example, popular tourist landmark. A set of visual clusters may collect all images depicting a particular landmark in various camera angles, camera distances, and light conditions. Whether this set of visual clusters contains all images and only those images having a particular landmark is a function of the effectiveness of the visual clustering method and parameters. The teachings of this disclosure apply whether or not a set of visual clusters has all images and only those images containing a particular landmark. For a geo-cluster, stage 501 creates an index of the images in the cluster. The index may be a list of the images in the cluster, having data elements including the original image or a reference to the original image, an image derived from the original image (for example, low resolution versions of the original image), one or more image templates and feature vectors, user identification, geo-tagging, time information, and any tags that have been assigned. In stage 502, each image in the geo-cluster is matched against the corresponding index. The matching process 502 generates references to matching images, for each images in the geo-cluster. After the matching process 502, the index may contain, for each image, references to all other matching images within that geo-cluster. The matching in stage 502, may include object recognition within each image to identify objects of interest such as landmarks, generating feature vectors for each identified object, and them comparing feature vectors to obtain match information. The comparison can be based on configurable numerical scores assigned to features included in feature vectors, and configurable numerical thresholds to classify two images as a matching pair. Methods of object recognition in images and of generating feature vectors are well known in the art. For example, methods of object recognition in images are described in David G. Lowe, "Object recognition from local scale-invariant features," *International Conference on Computer Vision*, Corfu, Greece (September 1999), pp. 1150-1157.

In stage 503, based on the index and the matches generated in stages 501-502, a match-region graph is generated. In the match-region graph, a node is an image, and the links between nodes indicate relationships between images. For example, a pair of images that match according to stage 502 would have a link between them. The match-region graph is used, in stage 504, to generate the visual clusters. Briefly, a visual cluster is a connected sub-tree in the match-region graph, after the weak links are pruned based on additional processing in stage 504. Weak links may be, where images are matched based on image or feature templates, the links with less than a threshold number of matching features. Some embodiments may consider links that do not match a specified set of features as weak links. Text label agreement, where available, between images in a cluster may be another criteria. Also, the number of images in a cluster may be considered when pruning weak links so as to minimize clusters with very few images. A person skilled in the art will understand that pruning weak links may be based on a variety of criteria, in addition to those described here. Lastly, the visual cluster data is saved in stage 505. The visual clusters may be saved to the landmark database 121. Along with the images and the object information of each visual cluster, other pertinent data including but not limited to, one or more text labels descriptive of the cluster, and one or more images particularly representative of the cluster, may be saved. A text label descriptive of the visual cluster may be generated, for example, by merging text labels of each constituent image of that cluster. One or more images particularly representative of a visual cluster may be useful to display in an index, for example, of popular tourist landmarks.

Figure 6:
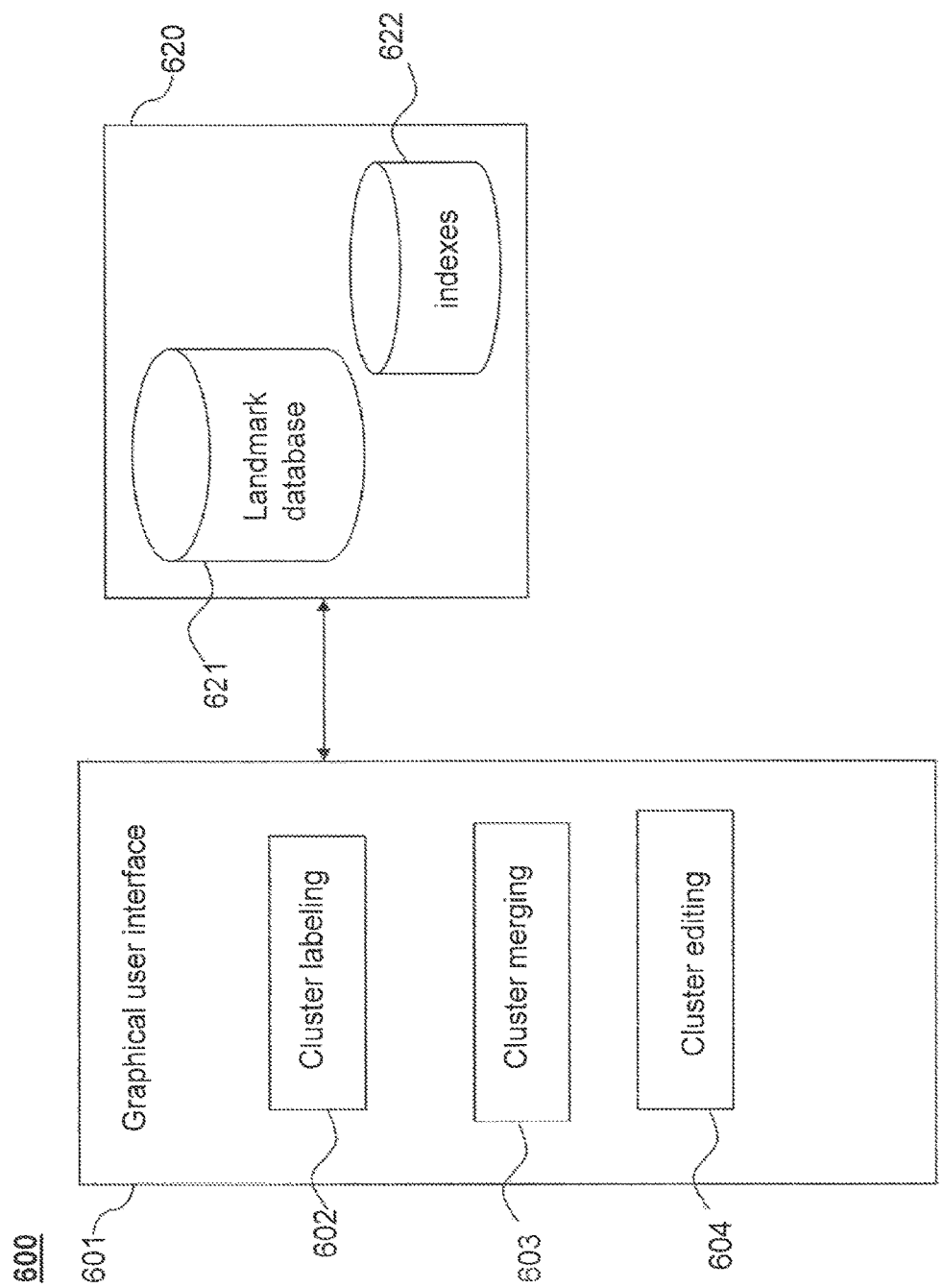
FIG. 6 is a graphical user interface used in one embodiment of the present invention.

In another embodiment of the present invention, user verification of the generated visual clusters is implemented. FIG. 6 illustrates a graphical user interface 601 that may display the images in each visual cluster to a user, and provide the user the ability to manually edit various aspects of each cluster. For example, graphical user interface may retrieve visual clusters stored in the landmark database 621 and write back the edited visual clusters to the same database 621. The graphical user interface 601 may include a cluster labeling module 602 that allows a user to assign a new text label and/or modify currently assigned text labels to each cluster and/or image. For example, cluster labeling module 602 may display each cluster with its current text label and the labels assigned to individual images in the cluster, and allow the user to modify the text label assigned to the cluster. A cluster merging module 603 may allow a user to merge or split clusters. Such manual merging or splitting of clusters may be desired by a user after having viewed the images in one or more clusters. A cluster editing module 604 may allow a user to add or delete individual images from clusters. Module 604 may be useful in manually eliminating a poor representation of a cluster's corresponding landmark, as well as to manually add one or more new images of a clusters corresponding landmark. In addition to the above, embodiments of the present invention may offer the user various options in interacting with the system 100.

Returning to FIG. 1, in some embodiments, a popularity module 104 may compute a popularity score for each visual cluster, and rank the visual clusters accordingly. One or more of the indexes 122 used for accessing landmark database 121 may be based on the popularity rankings computed by the popularity module. The popularity score of a cluster may be based on, one or more of, the total number of images in the cluster, number of unique users who have contributed images to the cluster, the number of images or images with unique user identifiers that are within a certain predetermined radius of the center of the visual cluster. It should be understood that the popularity score may also be computed using other methods not described above.

Figure 7:
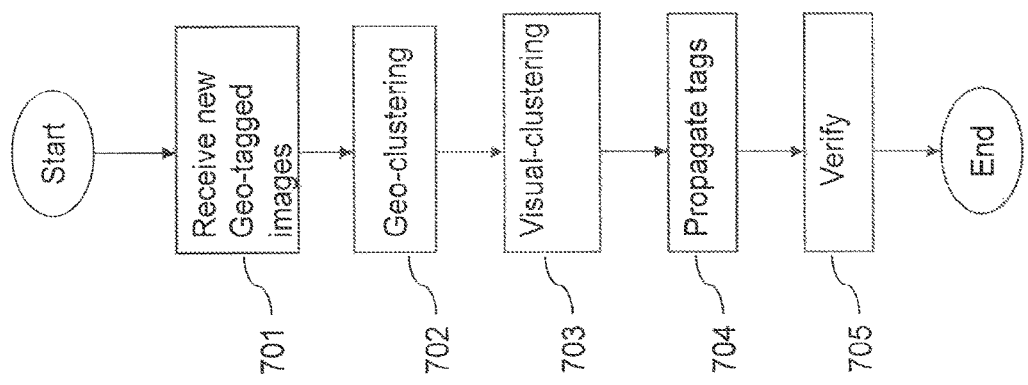
FIG. 7 is a method of updating a landmark image database according to an embodiment of the present invention.

In another embodiment of the present invention, the landmark database is grown incrementally. FIG. 7 is an exemplary process that may be used to incrementally grow the landmark database. Newly available geo-tagged images are downloaded to local storage or made available to the processing module 101 by other means in stage 701. In stage 702 geo-clustering is implemented over all available geo-tagged images including the new geo-tagged images. Geo-clustering was described above with respect to FIGS. 3-4. In stage 703, the geo-clusters resulting from stage 702 are subjected to visual clustering. Visual clustering was described above with respect to FIG. 5. Having completed the visual clustering, in stage 704, some embodiments may propagate some or all of the changes initiated by the user on the previous clustering in the visual clustering previously stored in the landmark database. For example, the user assigned or modified tags may be propagated to the new clustering. Optionally, in stage 705, the new visual clustering may be subjected to user verification and manual edit. Several types of user interaction were described above with respect to FIG. 6.

Figure 8:
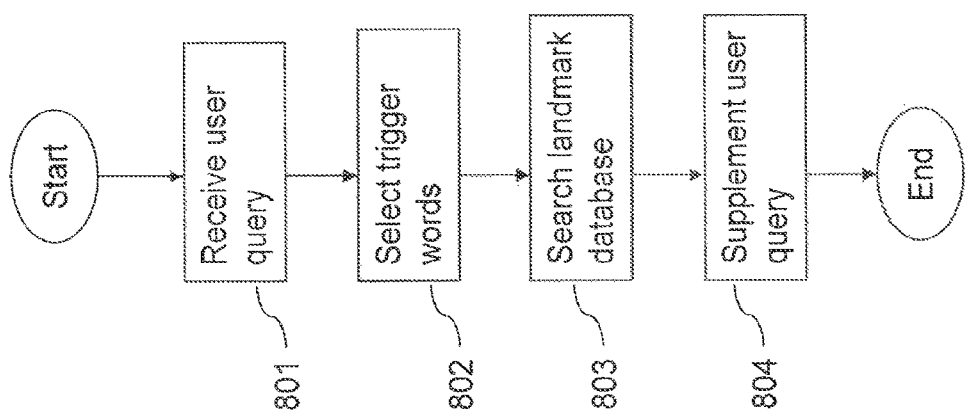
FIG. 8 is a method of enhancing user queries using stored landmark information, according to an embodiment of the present invention.

The system 100, having a landmark database 121, may enable many applications. For example, the landmark database 121 may be used to supplement user queries in order to make the queries more focused. FIG. 8 illustrates a process that may be used to supplement user queries in one embodiment. A received user query may be parsed for a set of predetermined trigger words in stage 802. For example, city names such as "Paris" may be used to trigger for landmarks in the city or vice versa. Having identified trigger words in the query, the landmark database may be searched in stage 803 for those trigger words to identify associated tag words. Following the earlier example, a trigger word of "Paris" may cause the search to discover "Eiffel Tower". The associated tag words that are identified are then used to supplement the query string in stage 804. Such supplemented query strings may be useful for finding a broader spectrum of relevant information.

Figure 9:
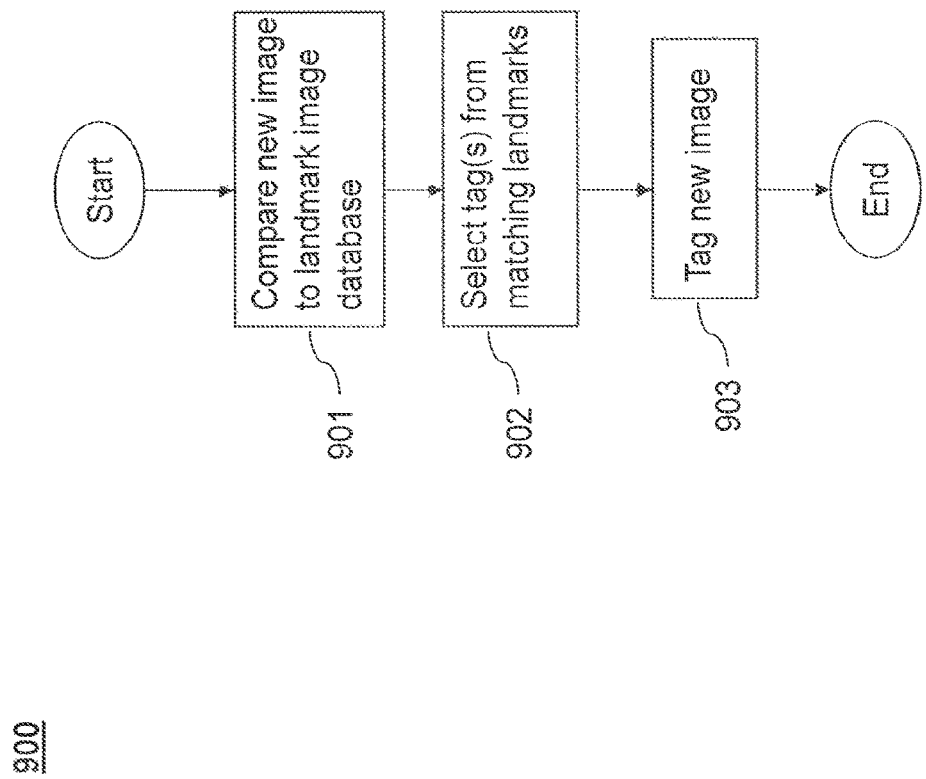
FIG. 9 is a method to automatically annotate images containing landmarks, according to an embodiment of the present invention.

Another application, in one embodiment of the present invention, is shown in FIG. 9. Process 900 may be used for on-line automated tagging of digital images. For example, in stage 901 a new digital image is compared to images in the landmark image database. If one or more matching images are found, then tags are generated in stage 902 based on all the matching images. In stage 903, the new image is tagged with the newly generated tags.

Figure 10:
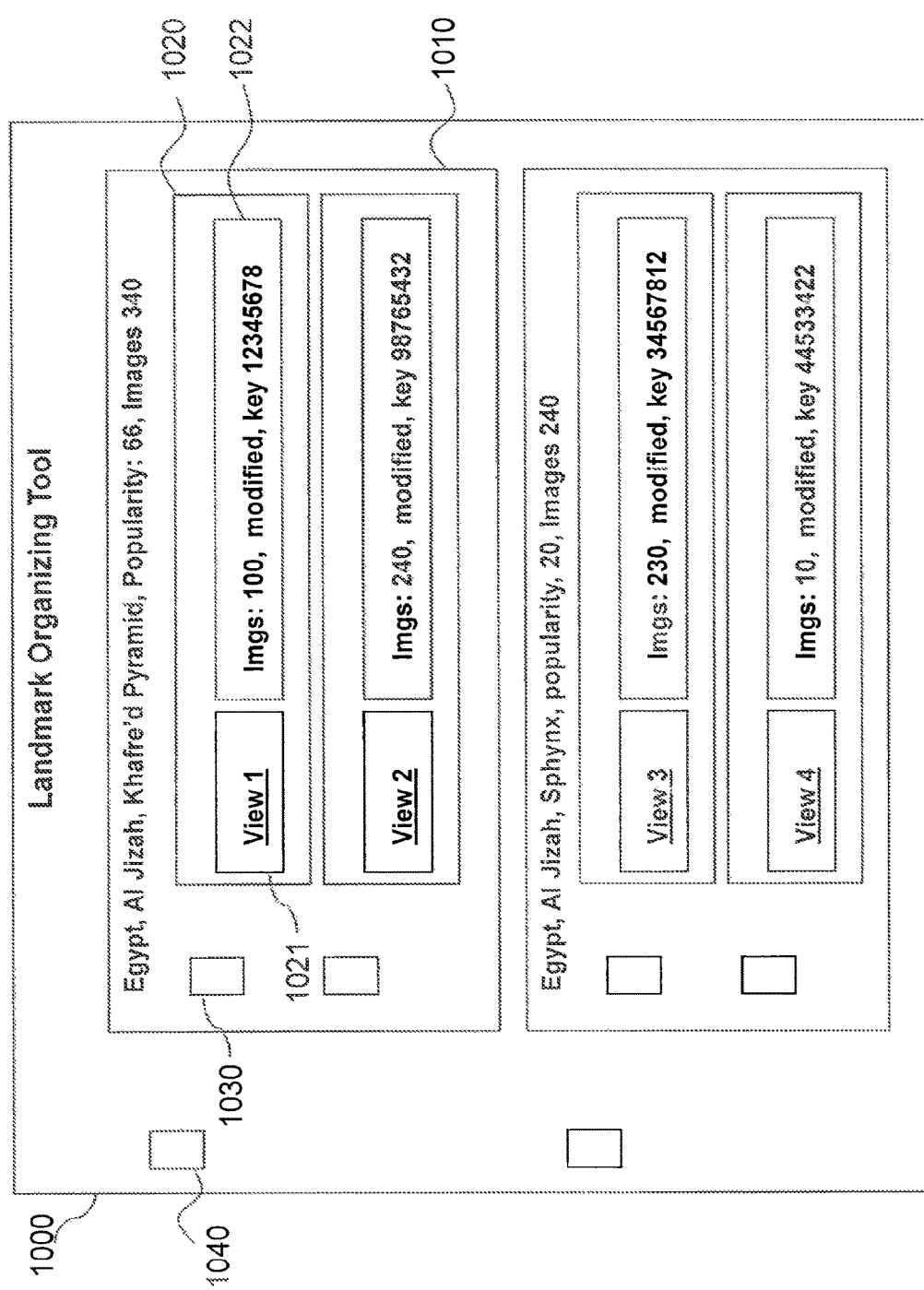
FIG. 10 is an example user interface screen, according to an embodiment of the present invention, showing information about landmarks and corresponding clusters, retrieved according to user-specified selection criteria.

FIG. 10 illustrates a user interface 1000 in an embodiment of the present invention where a set of landmarks is selected according to user input, and details about the visual clusters of each selected landmark are displayed. A landmark that is selected according to user-specified criteria may be displayed within each area such as 1010. Each selected landmark may also have an area for receiving user input, for example, such as check box 1040. For each displayed landmark, a summary list of the visual clusters can be displayed. The summary list of visual clusters can be displayed such that it is clearly shown to belong to the particular displayed landmark, for example, the summary list of visual clusters for the first displayed landmark can be contained within the display area 1010 corresponding to the first displayed landmark. Each entry 1020 of the summary list of visual clusters for a displayed landmark can have a corresponding location to receive user input specific to that cluster, such as, for example, the checkbox 1030 corresponding to the visual cluster represented in 1020. Each entry 1020 can include descriptive information about the cluster 1022 and a link 1021 to retrieve further details. For example, descriptive information about each cluster may include the number of images, popularity in terms of the number of unique users or authors contributing images to the cluster, information as to whether the cluster has been manually modified or verified, and any access information such as keys. The link 1021 includes a linking method such as a user-navigable hyperlink to retrieve the images and individual image related data of the selected cluster.

Figure 11:
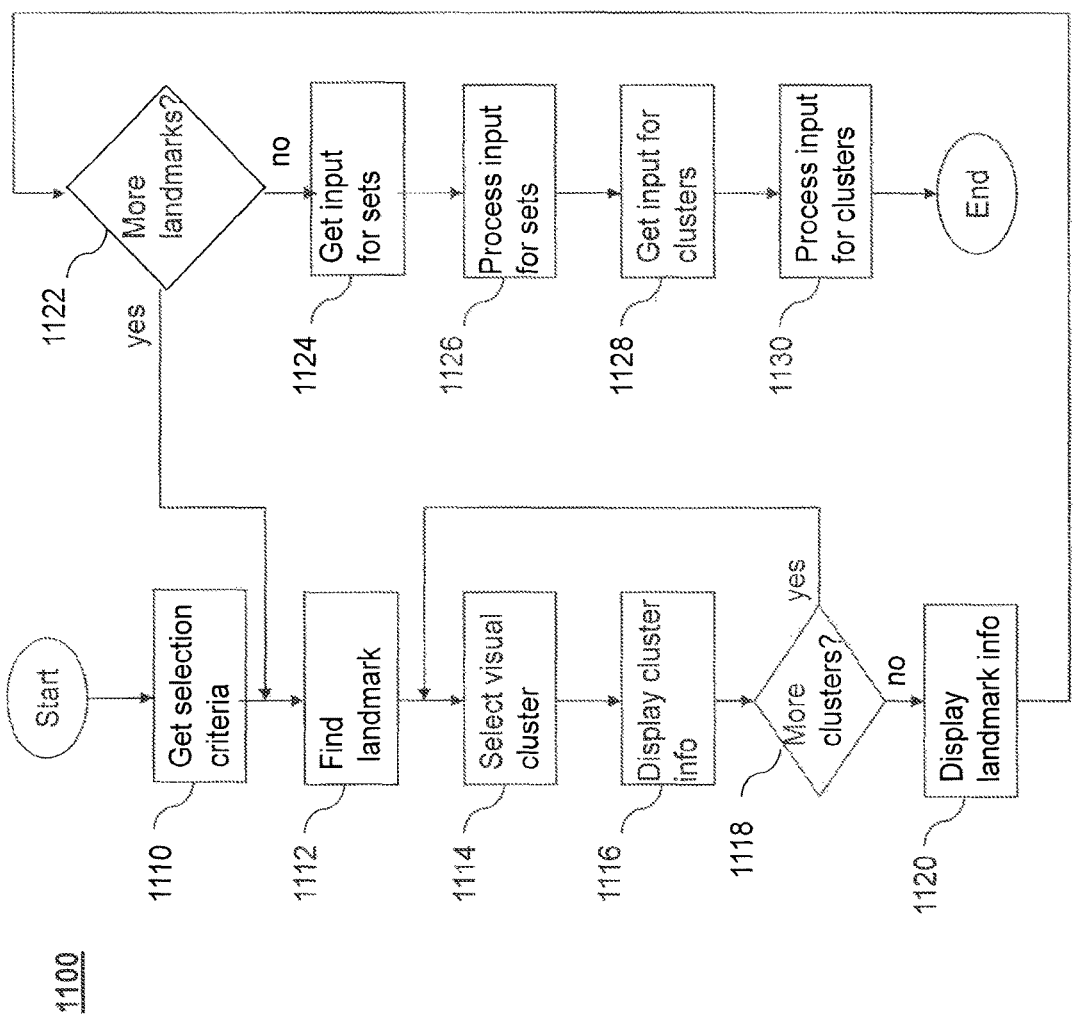
FIG. 11 is a flowchart illustrating the operation of a method to maintain clusters and landmarks according to an embodiment of the present invention.

FIG. 11 is a flowchart showing the processing related to interface 1000 in an embodiment of the present invention. In stage 1110, a user specifies one or more selection criteria, such as, country, city, region, and/or other keyword. User-specified information, including keywords can be used to search for images based on tags assigned to the images. The user may also specify other retrieval criteria such as a minimum level of popularity of the displayed landmarks, and landmarks having a minimum number of images submitted by users. For example, a user may want to view landmarks in Egypt for which at least 10 separate users have submitted images. The user may also specify that only landmarks having at least a specified number of images should be displayed. Stages 1112 through 1120 are repeated for each landmark satisfying the user-specified selection criteria. In stage 1112 one or more landmarks satisfying the user specified selection criteria is found. For each selected landmark, stages 1114 through 1116 are repeated to display the visual clusters having the selected landmark. In stage 1114 a visual cluster is selected, and in stage 1116 information descriptive 1020 of the visual cluster is displayed. For example, the number of images, the number of unique user identifiers or authors of images, a link to access the images in the cluster, other access information etc., may be displayed for each visual cluster. For each visual cluster that is displayed in stage 1116, a user input graphic, such as, for example, a checkbox 1030 can be displayed and enabled for user input.

In stage 1118, a determination is made as to whether there are more visual clusters to be displayed corresponding to the selected landmark. If no more visual clusters are to be displayed for the selected landmark, then in stage 1120, information about the landmark is displayed. For example, information such as the name and location of the landmark, popularity, number of images etc., can be displayed. For each landmark displayed in stage 1120, a corresponding user input graphic may also be displayed and enabled for user input. For example, in FIG. 10, a checkbox 1040 may receive user input corresponding to the landmark displayed in area 1010. In stage 1122, a determination is made as to whether there are additional landmarks to be displayed. If all landmarks that satisfy the user specified selection criteria have been displayed, then in stage 1124, user input corresponding to visual clusters is received. The user input corresponding to visual clusters may indicate, for example, that one or more clusters are to be merged, or that one or more clusters are to be disassociated from the selected landmark. In stage 1126 the visual clusters are processed accordingly. In stage 1128, user input corresponding to each landmark is received. The user input corresponding to each landmark may indicate, for example, that one or more landmarks are to be merged and/or deleted.

FIG. 12 shows a user interface 1200 in an embodiment of the present invention where a user can view information about a selected visual cluster. The interface 1200 may include an area 1210 where one or more example images representative of the selected visual cluster are displayed, an area 1220 in which a group of descriptive data elements including details of each image in the visual cluster are listed, and an area 1230 in which a selected image is displayed. The area 1220 may include descriptive information 1224 and corresponding user input graphic, such as check box 1222, for each image in the selected cluster. The descriptive information 1224 may include, for example and without limitation, a link to retrieve the corresponding image, data and time information for the image, author information for the image, and tag information. The area 1230 can display an image retrieved from the list displayed in 1220. The image displayed in area 1230 may enable the user, for example and without limitation, to view the region of interest 1232 in the displayed image. The ability to ascertain the region-of-interest in any image, for example, may allow the user to better determine the suitability of the particular image being in the current cluster.

FIG. 13 is a flowchart showing the processing related to interface 1200 in one embodiment. In stage 1310 user input is received selecting a visual cluster. In stage 1312, one or more images representative of the selected visual cluster is selected and displayed, for example, in area 1210. In stage 1314, information for each image in the selected cluster is displayed, for example, in area 1220. The information listed for each various data elements including, for example and without limitation, a link to retrieve the corresponding image, data and time information for the image, author information for the image, and tag information. A user input graphic, such as, for example, a checkbox 1222 may also be displayed for each listed image and enabled for user input. In stage 1316 user input is received. In stage 1318, the visual cluster is processed according to the received user input. For example, images can be deleted from the selected cluster, some tag information can be changed, etc.

In an embodiment of the present invention, the system and components of the present invention described herein are implemented using well known computers. Such a computer can be any commercially available and well known computer capable of performing the functions described herein, such as computers available from International Business Machines, Apple, Silicon Graphics Inc., Sun, HP, Dell, Compaq, Digital, Cray, etc.

Any apparatus or manufacture comprising a computer usable or readable medium having control logic (software) stored therein is referred to herein as a computer program product or program storage device. This includes, but is not limited to, a computer, a main memory, a hard disk, or a removable storage unit. Such computer program products, having control logic stored therein that, when executed by one or more data processing devices, cause such data processing devices to operate as described herein, represent embodiments of the invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:
   receiving, by one or more processors, a user query;
   identifying one or more trigger words in the user query;
   selecting one or more tags from a landmark database, the tags corresponding to the one or more trigger words;
   supplementing the user query with the one or more tags to generate a supplemented user query that describe a landmark;
   in response to receiving the supplemented user query, identifying a plurality of visual clusters from the landmark database wherein the plurality of visual clusters are associated with a landmark based on the supplemented user query;
   causing a user interface to be displayed, wherein the user interface includes the plurality of visual clusters;
   receiving user input wherein the user input indicates that a first visual cluster of the plurality of visual clusters and a second visual cluster of the plurality of visual clusters are to be merged, wherein the second visual cluster is different than the first visual cluster; and
   in response to receiving the user input, updating the landmark database to merge the first visual cluster and the second visual cluster.

2. The method of claim 1, wherein the user input further indicates that a third visual cluster of the plurality of visual clusters is to be disassociated from the landmark; and wherein updating the landmark database comprises disassociating the third visual cluster from the landmark in the landmark database.

3. The method of claim 1, wherein the user interface includes a user input graphic enabled to receive the user input.

4. The method of claim 1, wherein the user interface includes a plurality of user input graphics, wherein each of the plurality of user input graphics is associated with a respective visual cluster of the plurality of visual clusters, and is configured to receive the user input.

5. The method of claim 1, wherein the user interface includes a plurality of landmarks and one or more corresponding visual clusters.

6. The method of claim 1, wherein the user interface displays descriptive information comprising:
   a number of images;
   a popularity of the landmark wherein the popularity is based on a number of one or more authors that have contributed images to the plurality of visual clusters;
   an indication that one or more of the plurality of visual clusters have been modified by a user; and
   an indication that one or more of the plurality of visual clusters have been verified by the user.

7. The method of claim 1, further comprising:
   wherein the user input further indicates that one or more landmarks associated with the plurality of visual clusters are to be merged.

8. A system comprising:
   one or more processors; and
   logic encoded in one or more tangible media for execution by the one or more processors and when executed operable to perform operations comprising:
   receiving a user query;
   identifying one or more trigger words in the user query;
   selecting one or more tags from a landmark database, the tags corresponding to the one or more trigger words;
   supplementing the user query with the one or more tags to generate a supplemented user query that describe a landmark;
   in response to receiving the supplemented user query, identifying a plurality of visual clusters from the landmark database wherein the plurality of visual clusters are associated with a landmark based on the supplemented user query;
   causing a user interface to be displayed, wherein the user interface includes the plurality of visual clusters;
   receiving user input wherein the user input indicates that a first visual cluster of the plurality of visual clusters and a second visual cluster of the plurality of visual clusters to be merged, wherein the second visual cluster is different than the first visual cluster; and in response to receiving the user input, updating the landmark database to merge the first visual cluster and the second visual cluster.

9. The system of claim 8, wherein the user input further indicates that a third visual cluster of the plurality of visual clusters is to be disassociated from the landmark; and wherein updating the landmark database comprises disassociating the third visual cluster from the landmark in the landmark database.

10. The system of claim 8, wherein the user interface includes a user input graphic enabled to receive the user input.

11. The system of claim 8, wherein the user interface includes a plurality of user input graphics, wherein each of the plurality of user input graphics is associated with a respective visual cluster of the plurality of visual clusters, and is configured to receive the user input.

12. The system of claim 8, wherein the user interface includes a plurality of landmarks and one or more corresponding visual clusters.

13. The system of claim 8, further comprising applying one or more tags to the updated landmark database.

14. The system of claim 8, further comprising:
wherein the user input further indicates that one or more landmarks associated with the plurality of visual clusters are to be merged.

15. A non-transitory computer readable medium with instructions stored thereon that, when executed by a processor, cause the processor to perform operations comprising:
receiving a user query;
identifying one or more trigger words in the user query;
selecting one or more tags from a landmark database, the tags corresponding to the one or more trigger words;
supplementing the user query with the one or more tags to generate a supplemented user query that describe a landmark;
in response to receiving the supplemented user query, identifying a plurality of visual clusters from the landmark database wherein the plurality of visual clusters are associated with a landmark based on the supplemented user query;
causing a user interface to be displayed, wherein the user interface includes the plurality of visual clusters;
receiving user input wherein the user input indicates that a first visual cluster of the plurality of visual clusters and a second visual cluster of the plurality of visual clusters are to be merged; and
in response to receiving the user input, updating the landmark database to merge the first visual cluster and the second visual cluster.

16. The non-transitory computer readable medium of claim 15, wherein the user input further indicates that a third visual cluster of the plurality of visual clusters is to be disassociated from the landmark; and wherein updating the landmark database comprises disassociating the third visual cluster from the landmark in the landmark database.

17. The non-transitory computer readable medium of claim 15, wherein the user interface includes a user input graphic enabled to receive the user input.

18. The non-transitory computer readable medium of claim 15, wherein the user interface includes a plurality of user input graphics, wherein each of the plurality of user input graphics is associated with a respective visual cluster of the plurality of visual clusters, and is configured to receive the user input.

19. The non-transitory computer readable medium of claim 15, wherein the user interface includes a plurality of landmarks and one or more corresponding visual clusters.

20. The non-transitory computer readable medium of claim 15, wherein the user interface displays descriptive information comprising:
a number of images;
a popularity of the landmark wherein the popularity is based on a number of one or more authors that have contributed images to the plurality of visual clusters;
an indication that one or more of the plurality of visual clusters have been modified by a user; and
an indication that one or more of the plurality of visual clusters have been verified by the user.

21. The non-transitory computer readable medium of claim 15, further comprising:
receiving text input from one or more users wherein the text input includes one or more new text labels to be assigned to a merged visual cluster of the updated landmark database formed by merging the first visual cluster and the second visual cluster.

* * * * *